June 2, 1942.  A. M. SMITH  2,285,233
METHOD OF MAKING DYNAMO-ELECTRIC MACHINES
Filed Sept. 24, 1941   2 Sheets-Sheet 1
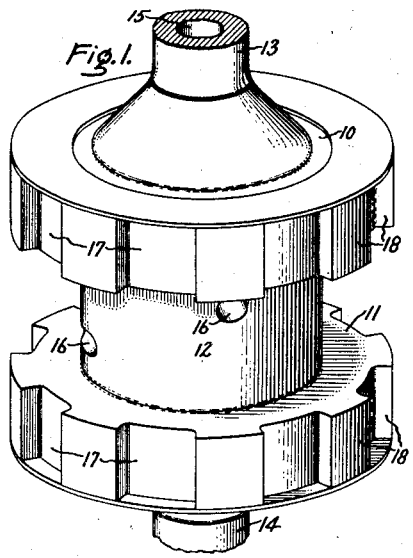
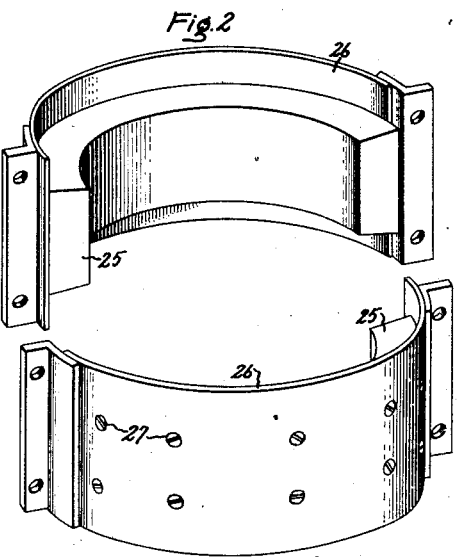
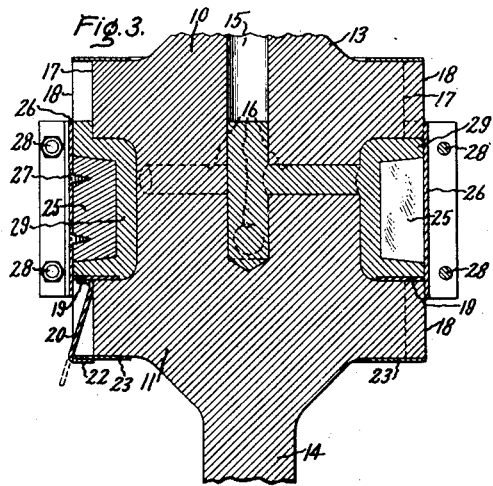
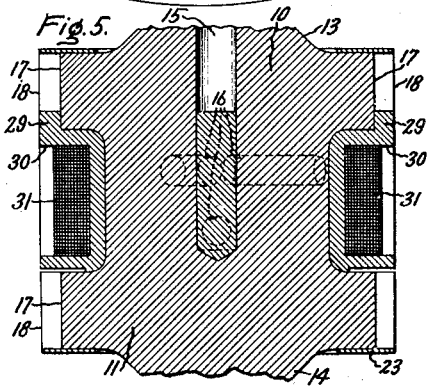
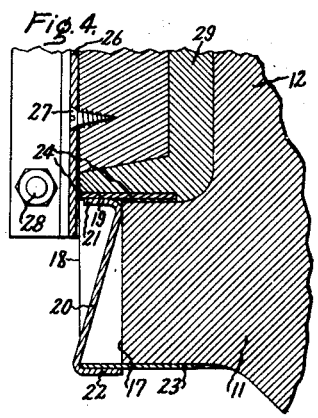
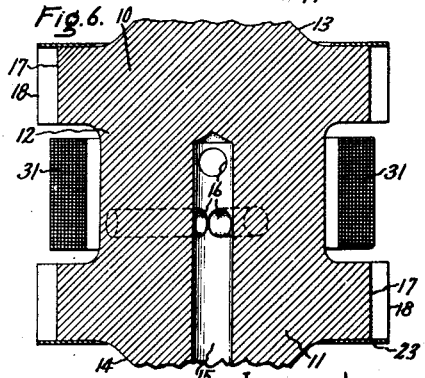
Inventor:
Arthur M. Smith,
by Harry E. Dunham
His Attorney.

June 2, 1942.          A. M. SMITH          2,285,233
METHOD OF MAKING DYNAMO-ELECTRIC MACHINES
Filed Sept. 24, 1941          2 Sheets-Sheet 2
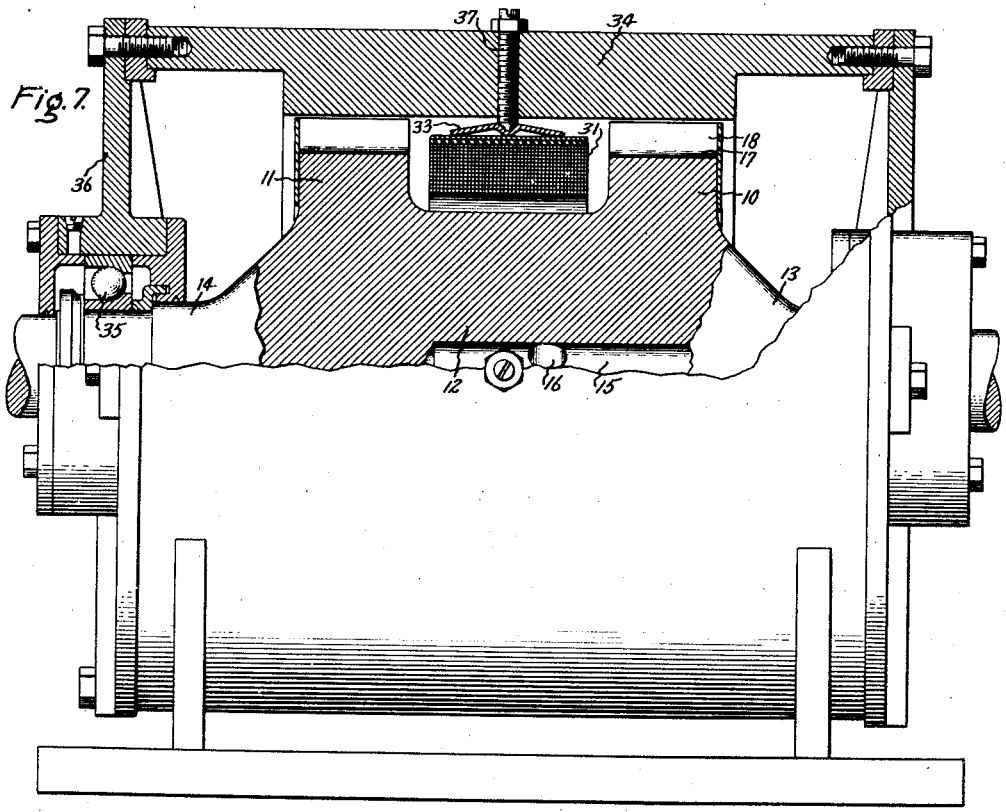
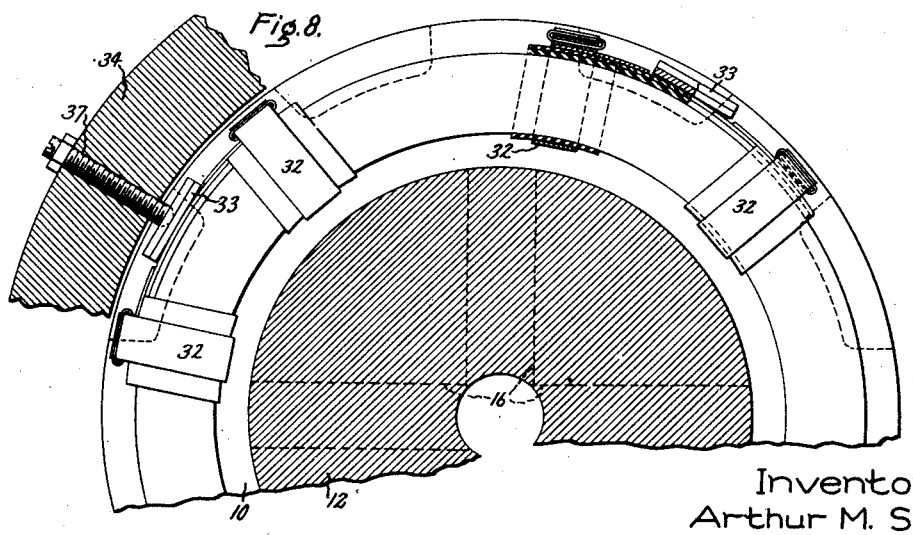
Inventor:
Arthur M. Smith,
by Harry E. Dunham
His Attorney.

Patented June 2, 1942

2,285,233

UNITED STATES PATENT OFFICE 2,285,233

METHOD OF MAKING DYNAMOELECTRIC MACHINES

Arthur M. Smith, Fort Wayne, Ind., assignor to General Electric Company, a corporation of New York Application September 24, 1941, Serial No. 412,123

12 Claims. (Cl. 29—155.5)

My invention relates to improvements in the method of making dynamo-electric machines and particularly inductor type machines provided with an annular exciting coil arranged about the central portion of the machine.

In certain types of homopolar dynamo-electric machines, such as inductor generators and inductor dynamometers, it is desirable to build the core of the rotatable member of a single unitary or integral piece of steel in order to provide an element which may resist high rotational stresses which may be set up therein at relatively high speeds. Furthermore, in certain machines of this type, it may become necessary to replace the field exciting winding on the machine without demounting the separate parts comprising the rotatable member. In the past it often has not been found very practicable to arrange an annular field exciting winding on the stationary member of this type machine without disassembling the rotatable member of the machine prior to the assembly of the winding on the stator.

An object of my invention is to provide an improved method of making a dynamo-electric machine.

Another object of my invention is to provide an improved method of making elements of a homopolar or inductor type dynamo-electric machine.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a perspective view of the rotatable member of a homopolar or inductor type dynamo-electric machine; Fig. 2 is an exploded perspective view of a coil former mold used in carrying out my invention; Fig. 3 is a partial sectional view showing the rotor of Fig. 1 and the mold of Fig. 2 in assembled relationship with the coil former cast therebetween; Fig. 4 is an enlarged view of a part of the arrangement shown in Fig. 3 to illustrate more clearly the arrangement of the coil former mold about the rotatable member core; Fig. 5 is a sectional side elevational view of the rotor core and coil former shown in Fig. 3 with the coil wound in position thereon; Fig. 6 is a side sectional elevational view of the arrangement shown in Fig. 5 with the core in position for melting out the cast coil former; Fig. 7 is a side elevational view of an inductor type dynamo-electric machine, partly in section, illustrating the assembly of the core and coil of Fig. 6 in the stationary member of the machine; and Fig. 8 is a partial end sectional view of the machine shown in Fig. 7.

Referring to the drawings, I have shown my invention in connection with an inductor type dynamo-electric machine including a unitary integral rotatable member provided with a shaft and a core having a pair of radially projecting portions 10 and 11 with an intermediate portion 12 of smaller diameter and shaft extensions 13 and 14 at each end of the pair of radially projecting portions 10 and 11. This rotatable member is formed in any suitable manner from an integral piece of steel, and an axially extending passage 15 is formed through the shaft extension 13 and into the core for the length of the core portion 12 of smaller diameter. A plurality of outwardly extending radial passages 16 is formed in the core portion 12 of smaller diameter from the outer periphery thereof into communication with the axially extending passage 15, and a plurality of substantially radially extending circumferentially spaced apart slots 17 is formed in the outer peripheral sides of the radially projecting core portions 10 and 11 to provide circumferentially spaced apart pole pieces 18. In order to wind an annular exciting coil about the core portion 12 of reduced diameter, I arrange a coil former mold about the reduced diameter core portion 12 to provide a substantially U-shaped cavity about this coil former mold. I have found it desirable to coat the coil former mold and the core with paraffin before casting a coil former about the coil former mold in order to insure complete removal of the material of which the coil former is cast after the coil has been formed. In order to facilitate application of the paraffin to the core and to the coil former mold, these two elements are placed in a substantially 100° C. oven for about four hours to raise their temperature above the melting point of the paraffin. After this, the shaft and rotor core and coil former mold are covered with paraffin and the coil former mold is arranged about the core. This coil former mold includes a pair of substantially semi-circular plates 19 which are arranged over the inner sides of the slots 17 adjacent the reduced diameter core portion 12 and away from the shaft extension 13 through which the axial passage 15 is formed. Supporting bracket elements 20 are arranged in slots 17 with a flange 21 secured as by spot welding to the outer side of the plates 19, and the outer end 22 of the bracket 20 then is bent around the under side of an annular plate 23 arranged on the core about the outer edge of the slots 17 to place the bracket 20 in tension. A felt strip or cotton tape 24 is arranged between the adjacent surface of the core pole pieces 10 of the radially projecting portion 11 and the semi-circular plates 19 in order to provide a seal therebetween. The coil former mold core and supporting elements then are arranged about the reduced diameter coil portion 12 and include two complementary sections each formed with an inwardly projecting arcuate coil former mold core 25 of any suitable material, such as wood, which is secured by screws 27 to substantially semi-cylindrical supporting frame plates 26. These two semi-cylindrical frame plates 26 are secured together by bolts 28 to form a cylindrical mold about the reduced diameter core portion 12 with the mold core portions 25 extending inwardly to provide a substantially U-shaped cavity about the mold in communication with the upwardly extending open slots 17 in the core portion 10 and with the outwardly extending passages 16 in the core. A felt strip or cotton tape 24 also is arranged between the outer edges of the plates or rings 19 and the adjacent inner surface of the mold plates 26 to provide a good seal therebetween, as shown in Fig. 4. The rotor and coil former then are placed in a vertical position with the hollow shaft extension 13 at the top, and the U-shaped cavity then is filled while the rotor and coil former mold are still warm by pouring or casting a suitable material, such as soft metal or a lead alloy, through the hollow shaft or through slots 17 until the U-shaped cavity is entirely filled, as shown in Fig. 3. Care must be taken that the soft metal does not flow over the outside of the mold, as difficulty might then be experienced in removing the mold from the magnetic core element. While it has been found desirable to cast this coil former of soft material in this manner, the same result might be obtained without providing an axial opening 15 through the shaft or outwardly extending openings 16 through the smaller diameter core portion 12 by pouring the coil former material through the upper slots 17 of the upper radially projecting core portion 10. The hollow shaft and outwardly extending passages 16, however, provide ventilating passages for the machine after it is assembled, and in some instances this type ventilation is very desirable. This soft metal provides a substantially U-shaped coil former 29, and when the material of the coil former is solidified, the coil former mold is removed and the inner surface of the coil former is machined to exact dimensions if desired, and a coating is applied over the interior of the coil former. This coating may comprise a black varnished cambric lining arranged over the outer surface of the alloy or may include two coats of a suitable varnish applied to the alloy and baked for substantially five hours at about 100° C. after each coat of varnish. This provides an annular opening 30 in the coil former 29 which is substantially the desired size of an annular field exciting winding 31 wound about the coil former 29, as shown in Fig. 5. After this winding has been wound, the assembly is baked about twelve hours at substantially 100° C. in the same vertical position. During this baking operation, a certain amount of the soft metal alloy may become soft or melt, and provision is made for the collection of this material. After the baking operation, the assembly is inverted from its former vertical position so that the hollow shaft extension 13 is lowermost, as shown in Fig. 6, and the assembly is placed in a substantially 130° C. atmosphere to melt out all remaining alloy. I have also found it practicable to place the assembly in this latter position for a shorter length of time than is necessary to melt out all of the soft metal forming the coil former and then scraping out the softened coil former material. The core and the field exciting winding coil 13 then are cooled, and coil retaining bands 32 are fastened about the coil and coil supports 33 to secure them in assembled relationship. The rotatable member and the coil 31 then are assembled in the machine stator 34. When in this position, bearings 35 supported in end plates 36 mounted on the stator 34 are adapted to support the rotatable member of the machine and adjustable set screws 37 extending through the stator 34 are screwed inwardly into contact with the coil supports 33 to maintain the field exciting winding coil 31 in position in the machine.

While I have illustrated and described a particular embodiment of my invention, modifications thereof will occur to those skilled in the art. I desire it to be understood, therefore, that my invention is not limited to the particular method and arrangement disclosed, and I intend in the appended claims to cover all modifications which do not depart from the spirit and scope of my invention.

What I claim as new and desire to secure by Letters Patent of the United States is:

1. The method of making an inductor type dynamo-electric machine which includes forming a rotor core having a pair of radially projecting core portions with an intermediate portion of smaller diameter, arranging a coil former mold about the intermediate smaller core portion providing a U-shaped cavity about the mold, casting a coil former in the U-shaped cavity, removing the coil former mold after the coil former casting is solidified, winding an annular exciting coil on the U-shaped coil former, and then heating the assembly to soften the coil former material and removing the cast coil former.

2. The method of making an inductor type dynamo-electric machine which includes forming a unitary rotor shaft and core having a pair of radially projecting core portions with an intermediate portion of smaller diameter, arranging a coil former mold about the intermediate smaller core portion providing a U-shaped cavity about the mold, casting a coil former in the U-shaped cavity, removing the coil former mold after the coil former casting is solidified, winding an annular exciting coil on the U-shaped coil former, and then heating the assembly to soften the coil former material and removing the cast coil former.

3. The method of making an inductor type dynamo-electric machine which includes forming on a rotor core having a pair of radially projecting core portions with an intermediate portion of smaller diameter with radially extending slots in the radially projecting core portions, a coil former mold about the intermediate smaller core portion providing a U-shaped cavity about the mold, filling the U-shaped cavity by pouring a molten soft metal therein through the slots in one of the radially projecting core portions to form a U-shaped coil former, removing the coil former mold after the soft metal is solidified, winding an annular exciting coil in the U-shaped coil former, and then heating the assembly to soften the coil former material and removing the soft metal coil former.

4. The method of making an inductor type dynamo-electric machine which includes forming a unitary rotor shaft and core having a pair of radially projecting core portions with an intermediate portion of smaller diameter, forming radially extending slots in circumferentially spaced apart relationship about the outer periphery of the radially projecting portions, arranging a coil former mold about the intermediate smaller core portion providing a U-shaped cavity about the mold, filling the U-shaped cavity by pouring a molten soft metal therein through the slots in one of the radially projecting core portions to form a U-shaped coil former, removing the coil former mold after the soft metal is solidified, winding an annular exciting coil in the U-shaped coil former, and then heating the assembly to soften the coil former material and removing the soft metal coil former.

5. The method of making an inductor type dynamo-electric machine which includes forming a unitary rotor shaft and core having a pair of radially projecting core portions with an intermediate portion of smaller diameter, forming slots in the outer periphery of the radially projecting portions, arranging a coil former mold about the intermediate smaller core portion providing a U-shaped cavity about the mold and closing the slots at one side adjacent the smaller core position, then placing the rotor in a vertical position with the open slots at the top, filling the U-shaped cavity by pouring a molten soft metal therein through the open slots to form a U-shaped coil former, removing the coil former mold after the soft metal is solidified, winding an annular exciting coil in the U-shaped coil former, then heating the assembly to soften the coil former material and removing the remaining soft metal coil former, cooling the assembly, and assembling the rotor in the machine stator.

6. The method of making an inductor type dynamo-electric machine which includes forming a unitary rotor shaft and core having a pair of radially projecting core portions with an intermediate portion of smaller diameter, forming slots in the outer surface of the radially projecting portions, arranging a coil former mold about the intermediate smaller core portion providing a U-shaped cavity about the mold and closing the slots at one side adjacent the smaller core portion, applying paraffin to the core and the mold, then placing the rotor in a vertical position with the open slots at the top, filling the U-shaped cavity by pouring a molten lead alloy therein through the open slots to form a U-shaped coil former, removing the coil former mold after the alloy is solidified, winding an annular exciting coil in the U-shaped coil former, removing the coil former mold after the alloy is solidified, winding an annular exciting coil in the U-shaped coil former, then heating the assembly to soften the coil former material and removing the remaining lead alloy coil former, cooling the assembly, and assembling the rotor in the machine stator.

7. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming a passage through the smaller diameter core portion from the outer periphery into communication with the axially extending passage, arranging a coil former mold about the intermediate smaller core portion providing a U-shaped cavity about the mold, then placing the rotor in a vertical position with the hollow shaft extension at the top, filling the U-shaped cavity by pouring a molten soft metal therein through the hollow shaft to form a U-shaped coil former, removing the coil former mold after the soft metal is solidified, winding an annular exciting coil in the U-shaped coil former, and then placing the assembly with the hollow shaft extension lowermost and melting out all remaining soft metal.

8. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming a passage through the smaller diameter core portion from the outer periphery into communication with the axially extending passage, arranging a coil former mold about the intermediate smaller core portion, providing a U-shaped cavity about the mold, then placing the rotor in a vertical position with the hollow shaft extension at the top, filling the U-shaped cavity by pouring a molten soft metal therein through the hollow shaft to form a U-shaped coil former, removing the coil former mold after the soft metal is solidified, winding an annular exciting coil in the U-shaped coil former, then placing the assembly in a substantially 130° atmosphere with the hollow shaft extension lowermost to melt out all remaining soft metal, cooling the assembly, then mounting coil supports on the coil, assembling the rotor in the machine stator, and securing the coil supports in position on the stator.

9. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming a passage through the smaller diameter core portion from the outer periphery into communication with the axially extending passage, arranging a coil former mold about the intermediate smaller core portion providing a U-shaped cavity about the mold, then placing the rotor in a vertical position with the hollow shaft extension at the top, filling the U-shaped cavity by pouring a molten soft metal therein through the hollow shaft to form a U-shaped coil former, removing the coil former mold after the soft metal is solidified, winding an annular exciting coil in the U-shaped coil former, then placing the assembly with the hollow shaft extension lowermost and melting out all remaining soft metal, cooling the assembly, then mounting coil supports on the coil, assembling the rotor in the machine stator, and securing the coil supports in position on the stator.

10. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming passages through the smaller diameter core portion from the outer periphery into communication with the axially extending passage, placing the unitary rotor and a coil former mold in a substantially 100° C. oven for about four hours, covering the shaft and rotor core and coil former mold with paraffin, arranging the coil former mold about the intermediate smaller core portion with a mold core of a size substantially that of an exciting coil for the machine extending into the space between the pair of adjacent radially projecting core portions providing a U-shaped cavity about the mold core, sealing the contact surface between the mold and the adjacent machine core with felt, then placing the rotor in a vertical position with the hollow shaft extension at the top, filling the U-shaped cavity while the rotor and coil former mold are still warm by pouring a molten lead alloy therein through the hollow shaft to form a U-shaped coil former, removing the coil former mold after the alloy is solidified, applying a black varnished cambric lining to the outer surface of the alloy, winding an annular exciting coil in the U-shaped coil former, then baking the assembly about twelve hours at substantially 100° C. and subsequently for about twenty-four hours at substantially 120° C. in the same vertical position, then placing the assembly in a substantially 130° C. atmosphere with the hollow shaft extension lowermost to melt out all remaining lead alloy, cooling the assembly, then mounting coil supports on the coil, assembling the rotor in the machine stator, and securing the coil supports in position on the stator.

11. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming a passage through the smaller diameter core portion from the outer periphery into communication with the axially extending passage, arranging a coil former mold about the intermediate smaller core portion, providing a U-shaped cavity about the mold, then placing the rotor in a vertical position with the hollow shaft extension at the top, filling the U-shaped cavity by pouring a molten lead alloy therein through the hollow shaft to form a U-shaped coil former, removing the coil former mold after the alloy is solidified, winding an annular exciting coil in the U-shaped coil former, then baking the assembly about twelve hours at substantially 100° C. and subsequently for about twenty-four hours at substantially 120° C. in the same vertical position, then placing the assembly in a substantially 130° C. atmosphere with the hollow shaft extension lowermost to melt out all the remaining lead alloy, cooling the assembly, then mounting coil supports on the coil, assembling the rotor in the machine stator, and securing the coil supports in position on the stator.

12. The method of making an inductor type dynamo-electric machine which includes forming a unitary rotor shaft and core having a pair of radially projecting core portions with an intermediate portion of smaller diameter and shaft extensions at each end of the pair of radially projecting portions, forming one of the shaft extensions with a passage extending axially therethrough into the core for the length of the portion of smaller diameter, forming passages through the smaller diameter core portion from the outer periphery into communication with the axially extending passage, arranging a coil former mold about the intermediate smaller portion with a mold core of a size substantially that of an exciting coil for the machine extending into the space between the pair of adjacent radially projecting core portions providing a U-shaped cavity about the mold core, sealing the contact surface between the mold and the adjacent machine core with cotton tape, placing the assembly in a substantially 100° C. oven for about four hours, covering the shaft and rotor core and mold with paraffin, then placing the rotor in a vertical position with the hollow shaft extension at the top, filling the U-shaped cavity while the rotor and coil former mold are still warm by pouring a molten lead alloy therein through the hollow shaft to form a U-shaped coil former, removing the coil former mold after the alloy is solidified, applying two coats of varnish to the alloy and baking for substantially five hours at about 100° C. after each coat of varnish, winding an annular exciting coil in the U-shaped coil former, then baking the assembly about twelve hours at substantially 100° C. and subsequently for about twenty-four hours at substantially 120° C. in the same vertical position, then placing the assembly in a substantially 130° C. atmosphere with the hollow shaft extension lowermost to melt out all remaining lead alloy, cooling the assembly, then mounting coil supports on the coil, assembling the rotor in the machine stator, and securing the coil supports in position in the stator.

ARTHUR M. SMITH.